US012587676B2

(12) United States Patent
Blasi et al.

(10) Patent No.: US 12,587,676 B2
(45) Date of Patent: Mar. 24, 2026

(54) COMBINED INTRA-PREDICTION MODE FOR BITSTREAM DECODER

(71) Applicant: British Broadcasting Corporation, London (GB)

(72) Inventors: Saverio Blasi, London (GB); Andre Seixas Dias, London (GB); Gosala Kulupana, London (GB)

(73) Assignee: British Broadcasting Corporation, London (GB)

( * ) Notice: Subject to any disclaimer, the term of this patent is extended or adjusted under 35 U.S.C. 154(b) by 8 days.

(21) Appl. No.: 17/261,841

(22) PCT Filed: Aug. 7, 2019

(86) PCT No.: PCT/GB2019/052224
§ 371 (c)(1),
(2) Date: Jan. 20, 2021

(87) PCT Pub. No.: WO2020/053547
PCT Pub. Date: Mar. 19, 2020

(65) Prior Publication Data
US 2021/0306662 A1 Sep. 30, 2021

(30) Foreign Application Priority Data
Sep. 11, 2018 (GB) ...................................... 1814755

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11); *H04N 19/132* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 10,045,043 B2 * | 8/2018 | Lee | ...................... | H04N 19/593 |
| 10,893,294 B2 * | 1/2021 | Rath | ................... | H04N 19/593 |

(Continued)

FOREIGN PATENT DOCUMENTS

WO 2018128511 A1 7/2018

OTHER PUBLICATIONS

United Kingdom Intellectual Property Office Search Report for Application No. GB1814755.3 dated Feb. 19, 2019 (3 pages).
(Continued)

*Primary Examiner* — Chikaodili E Anyikire
(74) *Attorney, Agent, or Firm* — Michael Best & Friedrich LLP

(57) ABSTRACT

The present invention relates to a method of decoding in a decoder 1 a bitstream representing an image comprising: receiving the bitstream; for each block in the bitstream: forming predictions; and adding a respective prediction to each residual sample to form a reconstructed image sample; providing a reconstructed image from the reconstructed image samples; and outputting the reconstructed image; wherein the step of forming a prediction comprises: applying a first directional or non-directional prediction mode to reference samples to form at least a first set of one or more predictions for the current block; and applying one or more subsequent, different, directional or non-directional prediction modes to the same reference samples to form at least one subsequent set of one or more predictions for the current block, where any subsequent directional prediction mode differs from any first directional prediction mode in the spatial direction of prediction.

17 Claims, 10 Drawing Sheets

(51) Int. Cl.
    *H04N 19/11*        (2014.01)
    *H04N 19/132*       (2014.01)
    *H04N 19/176*       (2014.01)

(56)                References Cited

U.S. PATENT DOCUMENTS

| 11,245,905 B2 * | 2/2022 | Urban ................. H04N 19/129 |
|---|---|---|
| 11,277,645 B2 * | 3/2022 | Budagavi ............... H04N 19/82 |
| 2012/0014444 A1 | 1/2012 | Min et al. |
| 2014/0010292 A1 * | 1/2014 | Rapaka ............... H04N 19/187 |
| | | 375/240.12 |
| 2017/0353736 A1 * | 12/2017 | Lin ...................... H04N 19/176 |
| 2019/0020888 A1 * | 1/2019 | Liu ...................... H04N 19/176 |
| 2019/0124339 A1 * | 4/2019 | Young ................. H04N 19/159 |
| 2020/0029073 A1 * | 1/2020 | Chiang ................. H04N 19/52 |
| 2020/0077089 A1 * | 3/2020 | Lee ...................... H04N 19/176 |
| 2020/0366895 A1 * | 11/2020 | De Luxán Hernández ................ |
| | | H04N 19/11 |
| 2020/0366900 A1 * | 11/2020 | Jun ...................... H04N 19/593 |
| 2021/0297677 A1 * | 9/2021 | Jang ...................... H04N 19/70 |
| 2021/0306662 A1 * | 9/2021 | Blasi ................... H04N 19/105 |
| 2021/0409785 A1 * | 12/2021 | Wang ................. H04N 19/172 |

OTHER PUBLICATIONS

International Search Report and Written Opinion for Application
No. PCT/GB2019/052224 dated Nov. 5, 2019 (15 pages).
Segall et al., "A Highly Efficient and Highly Parallel System for
Video Coding", Joint Collaborative Team on Video Coding 1st
Meeting, Apr. 2010, 49 pages.

* cited by examiner

MULTI-DIRECTIONAL INTRA PREDICTION

CURRENT BLOCK

REFERENCE SAMPLES

START INTRA-PREDICTION MODE

FINAL INTRA-PREDICTION MODE

Detect initial intra-prediction mode    502

Detect delta value    504

Compute sample values    506

Detect preceding intra-prediction mode —— 702

Detect final intra-prediction mode —— 704

Detect distance parameter —— 706

Infer first delta value —— 708

Infer second delta value —— 710

COMBINED INTRA-PREDICTION MODE FOR BITSTREAM DECODER

CROSS-REFERENCE TO RELATED APPLICATIONS

This application is the U.S. national stage entry, under 35 U.S.C. § 371, of International Application No. PCT/GB2019/052224, filed Aug. 7, 2019, which claims priority to GB Patent Application No. 1814755.3, filed on Sep. 11, 2018, the contents of which are incorporated herein by reference in their entirety.

TECHNICAL FIELD

This invention relates to image encoding and decoding, and in particular the invention relates to a method of decoding a bitstream representing an image.

BACKGROUND

Within an image or video codec, the exploiting of spatial redundancies enables more efficient encoding of an image. One of the most successful intra-prediction schemes consists in performing so-called directional intra-prediction. Each prediction is formed as a weighted average of one or more reference samples; the selection of which reference samples to use, as well as the weights applied to compute the average, depends on the specific intra-prediction direction. There are also non-directional modes of intra-prediction. This disclosure is concerned with intra-prediction and following usages of the terms "prediction" or the like should be understood accordingly.

SUMMARY OF THE INVENTION

According to at least one aspect of the present disclosure, there is described herein a method of decoding in a decoder a bitstream representing an image, where the bitstream comprises a plurality of blocks of residual samples, where a block of reconstructed image samples is obtained by adding a block of residual samples to a block of predictions, the predictions being formed by applying a selected prediction process to reference samples in the reconstructed image, the method comprising the steps of: receiving the bitstream; for each block: forming predictions; and adding a respective prediction to each residual sample to form a reconstructed image sample; providing a reconstructed image from the reconstructed image samples; and outputting the reconstructed image; wherein the step of forming predictions for the current block comprises: applying a first directional or non-directional prediction mode to reference samples to form at least a first set of one or more predictions for the current block; applying one or more subsequent, different, directional or non-directional prediction mode to the same reference samples to form at least one subsequent set of one or more predictions for the current block, where any subsequent directional prediction mode differs from any first directional prediction mode in the spatial direction of prediction; wherein at least one of the following prediction parameters is determined at the decoder for the current block and is not explicitly signalled in the bitstream: a first non-directional prediction mode; a direction of a first directional prediction mode; a subsequent non-directional prediction mode; a direction of a subsequent directional prediction mode; the location in the block of the first set of predictions; the location in the block of a subsequent set of predictions. This method allows samples in different parts of the block to be decoded using different intra-prediction modes and/or directions, which enable a more accurate prediction and therefore a reduction in the residuals required and a reduction in the number of bits required to define the image. This method may be used for decoding images within a video stream, so that an image may be transmitted with a lower bit-rate.

Preferably, the bitstream comprises data relating to the prediction, e.g. an indication of a final intra-prediction mode and/or the direction of a final directional prediction mode.

Optionally, the subsequent non-directional prediction mode is a final non-directional prediction mode and/or wherein the direction of a subsequent directional prediction mode is the direction of a final directional prediction mode.

Preferably at least one of the prediction parameters is determined based upon a corresponding parameter within an adjacent block. Preferably, the parameter is the final corresponding parameter used in the adjacent block. This enables the first direction and/or mode of prediction to be inferred as being that of the previous block, so that it does not need to be signalled within the bitstream.

Preferably at least one of the prediction parameters is determined by interpolating between one direction and/or prediction mode and another, different direction and/or prediction mode.

Preferably, at least one of the prediction parameters is determined by interpolating between the initial direction and/or prediction mode and a final direction and/or prediction mode. Preferably, the interpolating comprises linearly interpolating.

Preferably, at least one of the prediction parameters is determined by obtaining a value from a look-up table. The look-up table may comprise an indication of a function used for interpolating between at least one of: the initial non-directional prediction mode and the subsequent non-directional prediction mode; and/or the direction of an initial directional prediction mode and the direction of a subsequent directional prediction mode.

Preferably the bitstream defines a process to derive one or more subsequent directional or non-directional prediction modes given a different directional or non-directional prediction mode.

Preferably the bitstream comprises a delta related to the difference between the direction of a first directional prediction mode and the direction of a subsequent directional prediction mode.

Preferably, the bitstream comprises a delta related to the difference between at least one of: the first non-directional prediction mode and a subsequent non-directional prediction mode; and/or the direction of an initial directional prediction mode and the direction of a subsequent directional prediction mode.

Preferably, the bitstream comprises an indication of a change between a non-directional prediction mode and a directional prediction mode, preferably wherein the indication identifies a location at which the change occurs.

Also disclosed herein is a computer program product adapted to cause a programmable apparatus to implement a method according to any one of the preceding claims.

According to another aspect of the disclosure herein, there is described an apparatus for decoding a bitstream representing an image, where the bitstream comprises a plurality of blocks of residual samples, the apparatus comprising: a receiver arranged to receiving the bitstream; a processor arranged to: for each block: form predictions; add the respective predictions to the residual samples to form reconstructed image samples; provide a reconstructed image from the reconstructed image samples; and output a reconstructed image; wherein being arranged to form predictions comprises being arranged to: apply a first directional or non-directional prediction mode to reference samples to form at least a first set of one or more predictions for the current block; apply one or more subsequent, different, directional or non-directional prediction modes to the same reference samples to form at least one subsequent set of one or more predictions for the current block, where any subsequent directional prediction mode differs from any first directional prediction mode in the spatial direction of prediction; determine at least one of the following prediction parameters that is not explicitly signalled in the bitstream: a first non-directional prediction mode; a direction of a first directional prediction mode; a subsequent non-directional prediction mode; a direction of a subsequent directional prediction mode; the location in the block of the first set of predictions; the location in the block of a subsequent set of predictions.

A computer program product may be provided, adapted to cause programmable apparatus to implement any of these methods.

Apparatus may be provided, configured to implement a method according to any of these methods.

In general, the present disclosure relates at least to a method of using different intra-prediction modes within a block of a video frame, where this is useable to exploit spatial redundancies within blocks and lead to a reduction in the size of the bitstream. In an example, each sample of the block undergoes intra-prediction using a different direction, where the change in direction may be inferred based upon, for example, the directions used at the boundaries of the block.

Also described herein is a method of decoding a video bitstream comprising the steps of: receiving a bitstream relating to a video frame; wherein the bitstream relates to a plurality of blocks of pixels; determining an initial intra-prediction feature related to one block of the plurality of blocks; determining a change in the intra-prediction feature between a plurality of pixels within the block; determining an intra-prediction matrix for at least one pixel within the block dependent upon the identified initial intra-prediction feature and the identified change in the intra-prediction feature; wherein the intra-prediction matrix is useable to predict a value for the at least one pixel dependent upon reference values of a reference set of pixels. Relating to a plurality of blocks of pixels may comprise containing residuals relating to the values of pixels.

BRIEF DESCRIPTION OF THE DRAWINGS

The invention will now be described by way of example with reference to the accompanying drawings, in which.

DETAILED DESCRIPTION OF CERTAIN EMBODIMENTS

Figure 1:
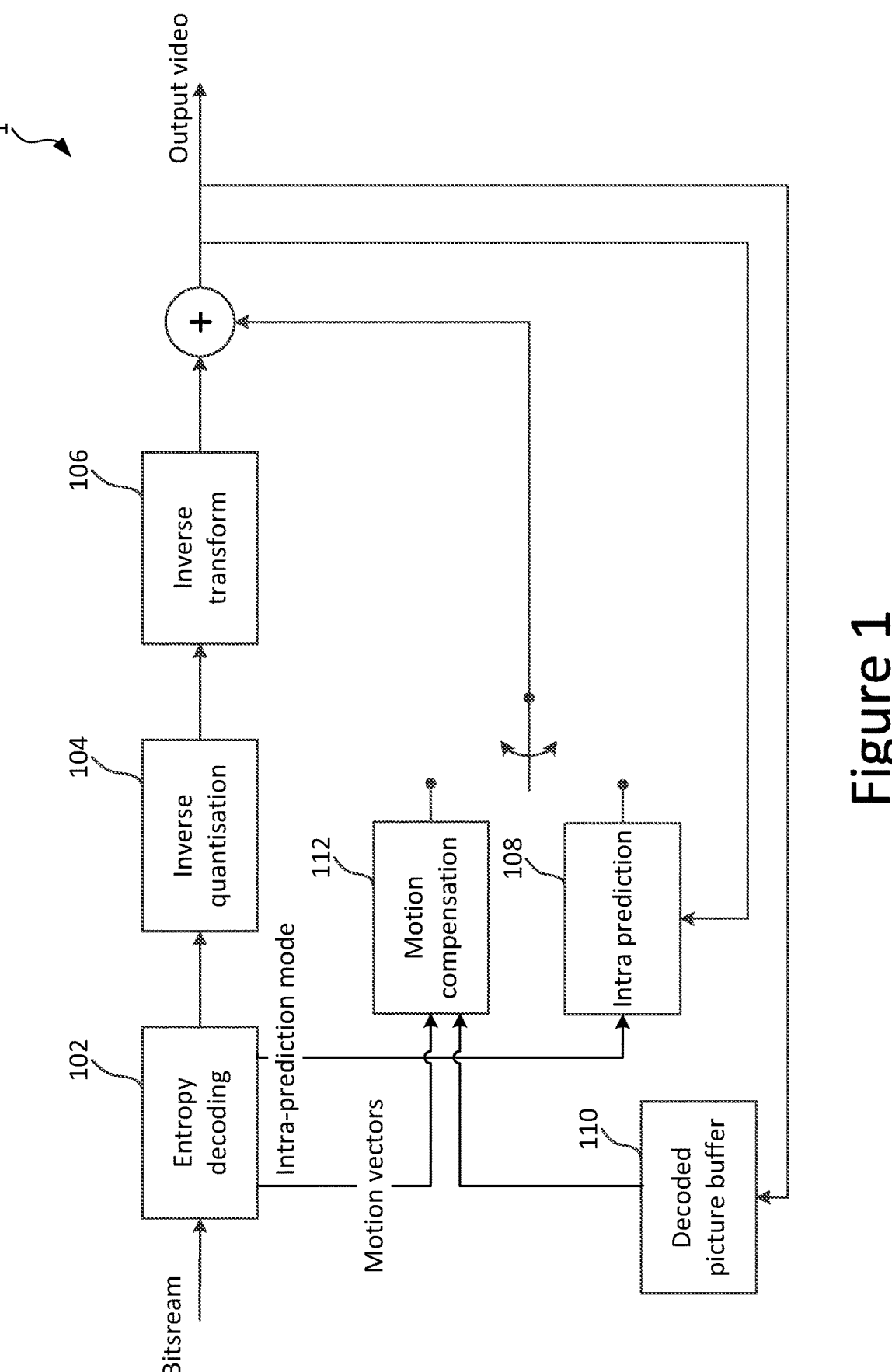
FIG. 1 shows a video bitstream decoder.

There is shown in FIG. 1 a typical decoder in which a bitstream representing video images is received and processed to obtain a video stream. The decoder comprises an entropy decoding stage 102, an inverse quantisation stage 104, and an inverse transform stage 106, via which a received bitstream is sequentially processed usually to obtain residuals.

The residuals are added to respective predictions to obtain output images that form an output videostream.

In the case of inter prediction, a previous image or images, made available in the decoded picture buffer 110, undergo motion compensation 112, using motion vectors specified in the bitstream.

This disclosure is concerned with intra-prediction block 108 which conventionally uses an intra-prediction mode specified within the bitstream, as is described in further detail with reference to FIGS. 2a and 2b.

Figure 2A:
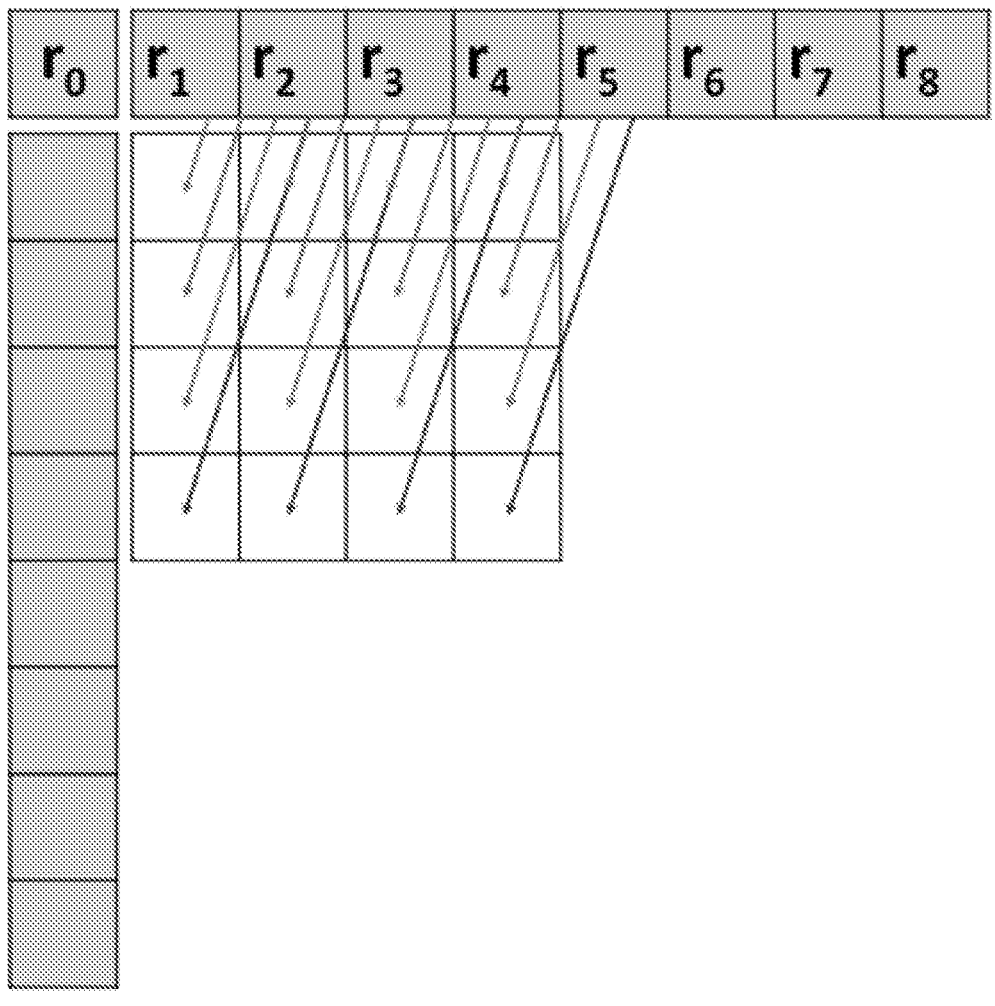
FIG. 2 (a)-(b) show exemplary block prediction using conventional directional intra-prediction.

FIG. 2a shows a method of conventional directional intra-prediction. The values of each sample within a block are predicted as a weighted average of reference samples extracted from the reference sample buffer. The selection of which reference samples to use, as well as the weights applied to each reference sample, depend on an intra-prediction direction that is specified. The direction used in FIG. 2 is a 'vertical-left' prediction mode. A range of other directional modes, e.g. horizontal, or 'horizontal-down' and/or non-directional intra-prediction modes, such as the DC and planar modes of the high efficiency video coding (HEVC) standard may also be used. The mode to use is signalled in the bitstream related to each block.

For instance, the top-left sample in the current block in the figure is predicted using a weighted average of reference samples r1 and r2, which in this example are taken from blocks above the current block. According to the direction specified by the intra-prediction mode, sample r1 will have a larger impact in the prediction, meaning its weight will be higher than that applied to r2 when computing the average.

DC intra-prediction modes, where the average value of a set of the reference samples (e.g. r1-r4 and the corresponding vertical values of FIG. 2a) is used for each predicted sample, and planar intra-prediction modes are known in the art.

The reference samples here are shown as taken from a single row above and single column to the left of the current block. In some embodiments, the set of reference samples may be larger, for example there may be two or more reference rows or columns. Reference samples are typically obtained from blocks that have already been reconstructed in the decoder—and are thus available to predict the current block. Such blocks are conventionally depicted as above or to the left of the current block. This does not preclude operation in other block scanning schemes or degrees of parallel operation.

Figure 2B:
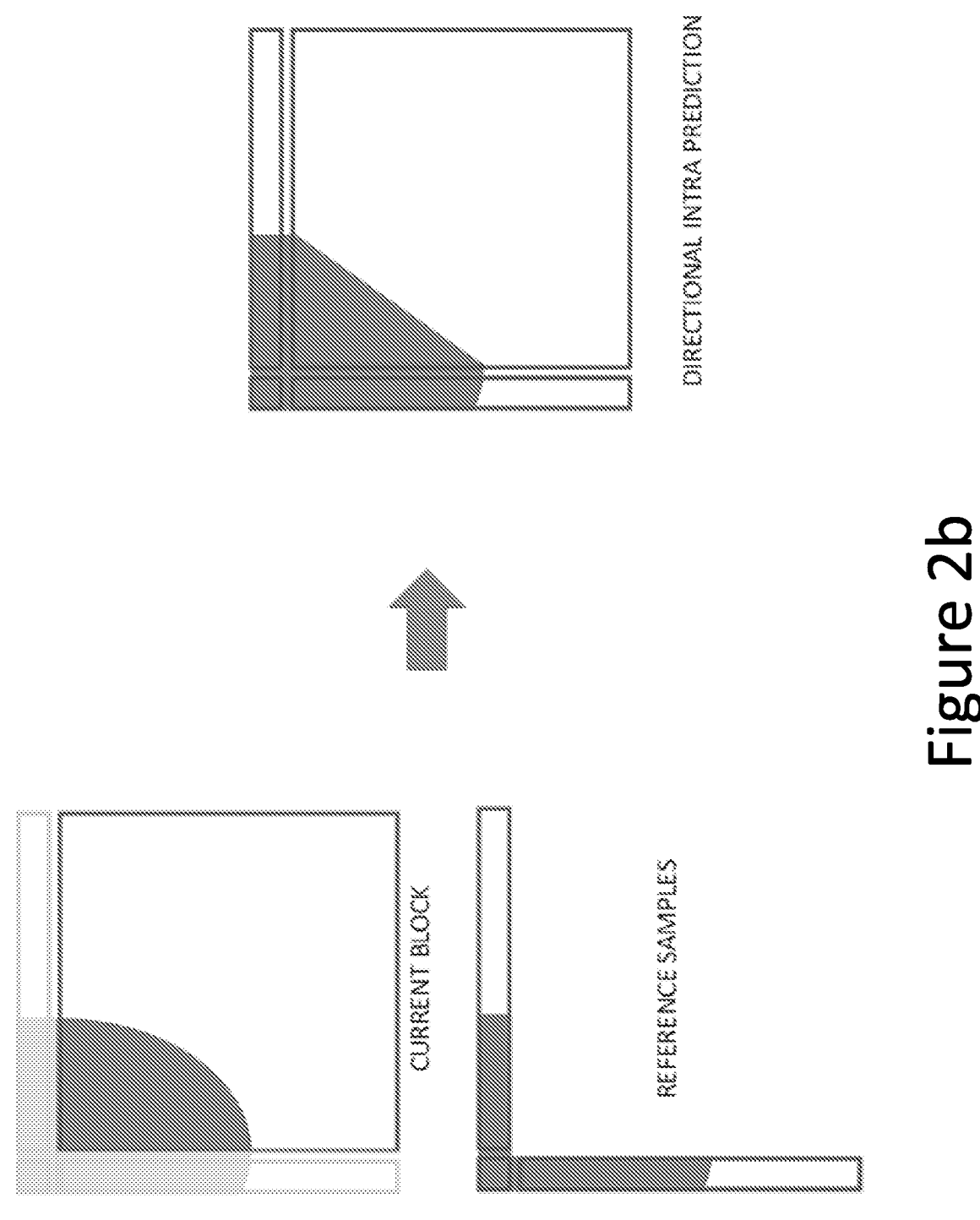

FIG. 2b shows the intra-prediction method described with reference to FIG. 2a being used to predict the values within a block containing a curved object. Conventional intra-prediction makes use of a single directional mode applied to the reference samples to predict the current block, resulting in the directional intra-prediction shown on the right-hand side of FIG. 2b. This prediction is substantially different from the actual content of the block, resulting in high residuals and consequently higher bitrates when compressing an associated bitstream.

Figure 3A:
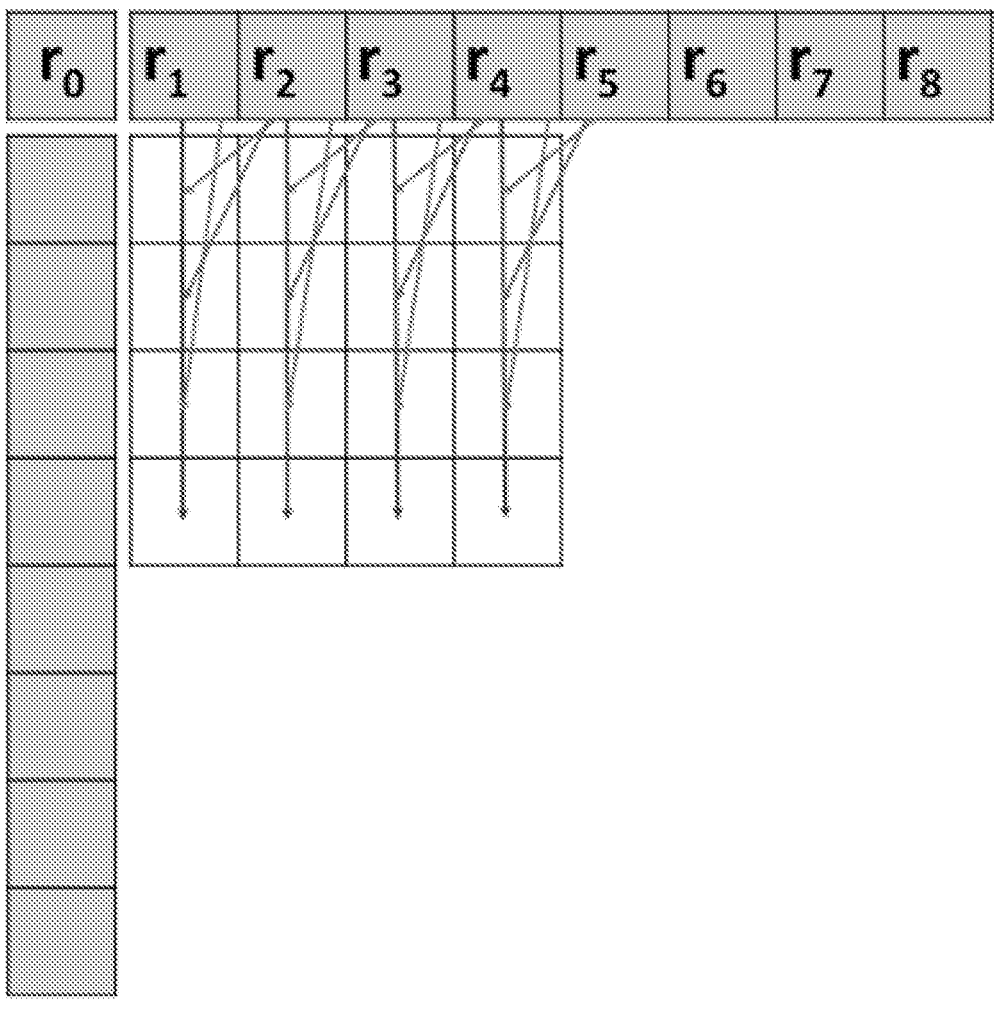
FIG. 3 (a)-(b) show exemplary block prediction using multi-directional intra-prediction.

FIG. 3a shows a multi-directional intra-prediction method as is described herein, which consists of utilising different intra-prediction modes and/or different intra-prediction directions to predict samples in different areas of the block. This method can be used to obtain an intra-predicted block that is closer to the content of the actual block.

Multi-directional intra-prediction does not require any additional sample to be loaded in the intra-prediction buffers (hence having the same memory requirements as conventional directional prediction) and the same interpolation filters used in conventional intra-prediction can be used for each sample in the block. Moreover, the process does not introduce any additional dependency at the decoder side, therefore not affecting the throughput of the decoder. The process has a very limited impact on the decoder complexity because the same number of interpolations as in conventional directional prediction is required to perform multi-directional intra-prediction.

Figure 3B:
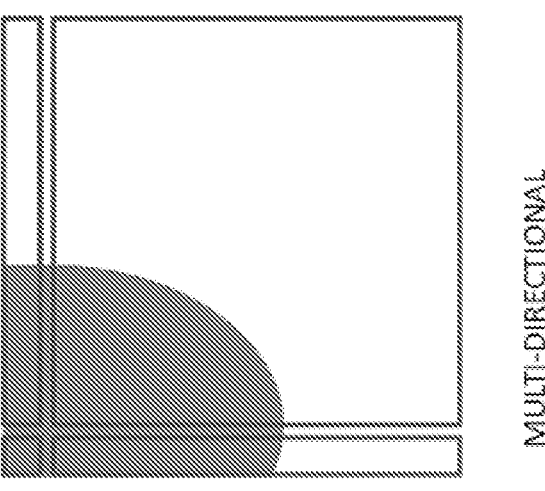
Figure 3B:
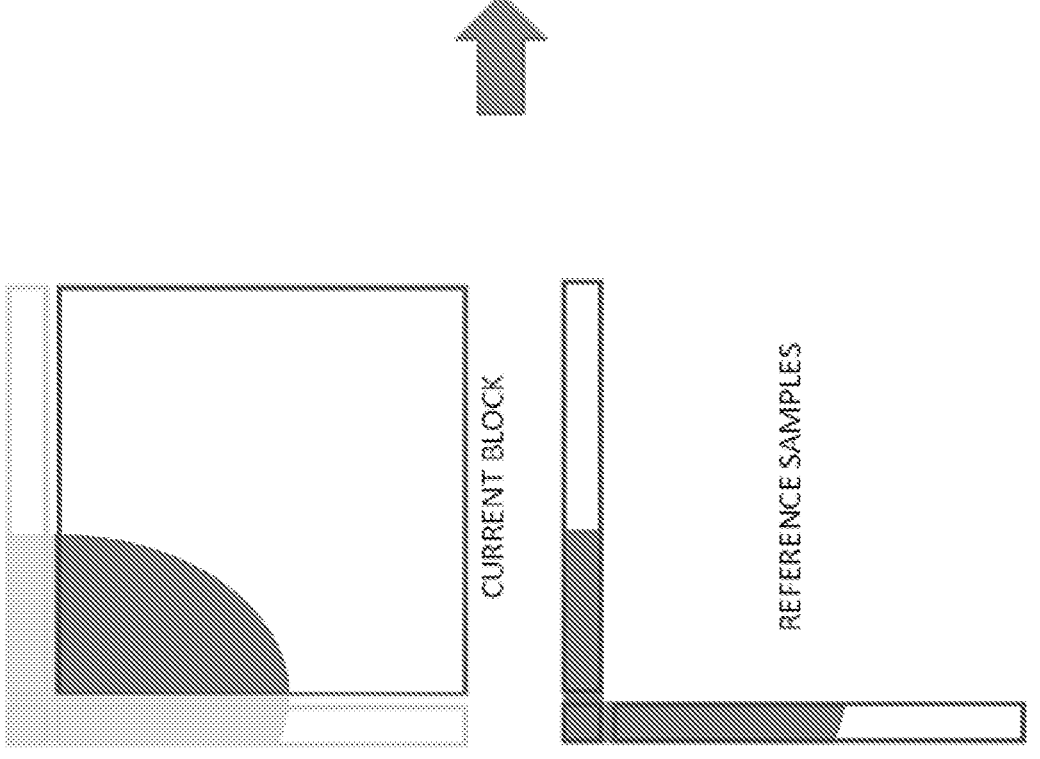

The prediction obtained using an exemplary method of performing multi-directional intra-prediction is shown in FIG. 3b, which considers a prediction based upon the current block and reference samples shown within FIG. 2b. Here it is illustrated how the use of different prediction directions is useable to achieve a closer prediction and correspondingly lower residuals than the conventional intra-prediction of FIG. 2b.

In some embodiments, multi-directional intra-prediction can be used by defining a "start intra-prediction mode" and a "final intra-prediction mode", which may be used to reduce the bitrate associated with multi-directional intra-prediction. With no loss of generality, an embodiment is described with reference to FIG. 3a that concerns vertical directions. The method works by gradually changing the direction of the prediction in each row in the prediction block. More generally, the same process can be applied to horizontal directions replacing rows with columns in the prediction block.

In this embodiment, the current block is predicted with a vertical intra-prediction mode; the block on top of the current block is also predicted using a vertical intra-prediction mode. The object in the block above may continue propagating in the current block with a certain curvature. By using the intra-prediction mode extracted from the block on top to define the "start intra-prediction mode" for the current block, and appropriately signalling the "final intra-prediction mode" (for instance following conventional intra-prediction mode signalling), the prediction can be performed to closely follow the curvature of the object in the block. More specifically, a vector of directions D can be defined, where the length of the vector corresponds to the number of rows H in the block. Each element in the vector contains the direction used to predict a given row. The first element in the vector is set to be the direction of the block above, that is $d(1)=d_{above}$. The last element in the vector is set to be the intra-prediction mode signalled in the bitstream, or $d(H-1)= d_{signalled}$. Elements in between can be computed using increasing or decreasing directions obtained by summing or subtracting a step obtained depending on the difference between start and final mode as well as on the height of the current block H. Different techniques can be used to compute the elements of D.

Figure 4:
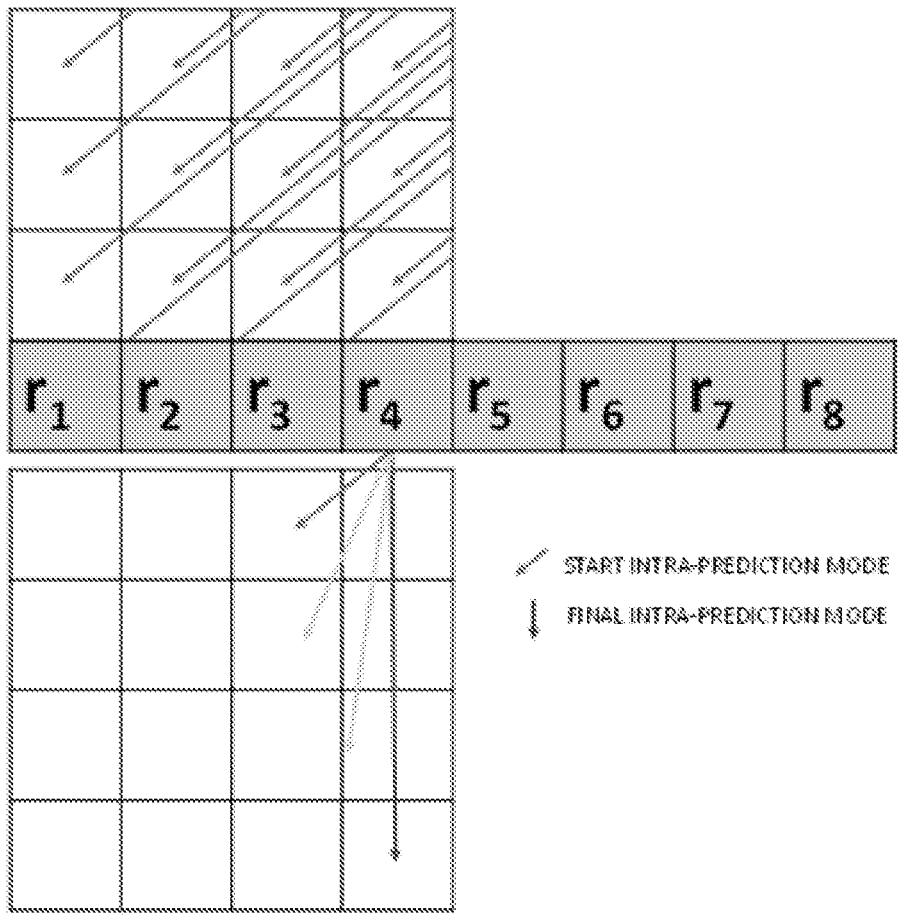
FIG. 4 shows multi-directional intra-prediction where the initial direction is inferred.

This embodiment of the described method can provide accurate predictions at the cost of a single additional binary flag, which is used to signal whether the technique is used or not on a given block. The same can be applied in the case of considering horizontal prediction, in which case the method can be applied in case the block immediately on the left of the current block is predicted using a horizontal mode. The exemplary method is illustrated in FIG. 4. It should be noticed that the information needed to compute the vector D, namely the intra-prediction mode of neighbouring blocks, is already required by the decoder to compute the list of most probable modes used when parsing the intra-prediction mode from the bitstream, and therefore using this information does not add any additional dependency to the decoder.

In cases in which neighbouring blocks are not available or are predicted using a mode that cannot be used as "start intra-prediction mode", additional references can be used to enable multi-directional intra-prediction. In some embodiments, look-up tables are used to identify a collection of "start intra-prediction modes", in other embodiments a default "start intra-prediction mode" is defined by the decoder 1 and/or within the bitstream.

In various embodiments, specific look-up tables are constructed for blocks for various cases, such as different block sizes, or different final intra-prediction modes. In these cases, in addition to a flag used to signal whether to use multi-directional intra-prediction, an index is signalled, to select the correct element in the table.

Some embodiments consider a fixed delta that is added or subtracted from the "final intra-prediction mode", to obtain the "start intra-prediction mode". In this case, in addition to a flag used to signal whether to use multi-directional intra-prediction, an additional flag should be sent in the bitstream to signal which start intra-prediction to use (whether the "final+delta" or the "final−delta"). The signalling should take into account the cases in which the obtained "start intra-prediction mode" is not a valid direction, in which case, no additional signalling is required. The value "delta" could be defined depending on specific characteristics of the block, such as for instance the width and height, or the current "final prediction mode" being used. The value "delta" could also be defined within the bitstream.

Features of multiple embodiments can be combined together to define methods of parsing the information needed to perform the multi-directional intra-prediction. The information related to neighbouring blocks is available at the decoder side during parsing of the bitstream, and therefore the decoder can make use of this information to decide how many bits to decode related with the multi-directional intra-prediction.

The described method differs from that obtained by partitioning the current block in smaller blocks, and then using different intra-prediction modes in each partition not least since using a single block and changing the direction within the block allows the decoder to perform the prediction with a very small overhead in terms of signalling necessary to describe the directionality. In some of the described embodiments, the direction to apply in many of the lines of the block is inferred, and therefore does not need any additional signalling to be parsed from the bitstream. Moreover, partitioning the block in smaller blocks would require the codec to perform additional operations (in order to reconstruct each of the sub-blocks). Using the proposed method instead does not add any overhead in terms of reconstruction, keeping the decoder complexity almost unchanged with respect to conventional intra-prediction applied to the whole block. Finally, some of the variations of the proposed method exploit information extracted from neighbouring blocks to vary the directionality of the prediction within the current block, which is not used in conventional intra-prediction in which the direction of the prediction remains unvaried within the whole prediction block.

Figure 5:
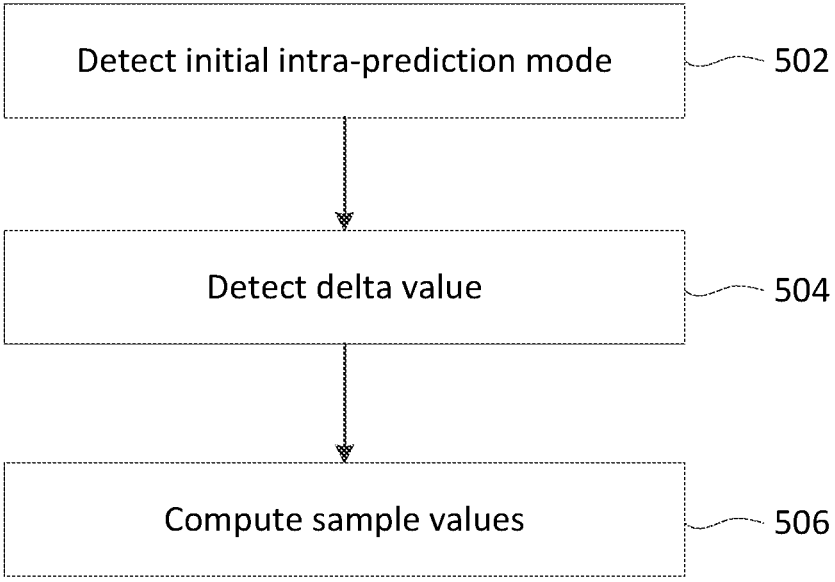
FIG. 5 is a flowchart for a method of performing multi-directional intra-prediction.

FIG. 5 shows a flowchart for a method of computing intra-predicted samples.

In a first step 502, an initial intra-prediction mode is detected. In some embodiments, this comprises detecting a section within a received bitstream that identifies an intra-prediction mode. In this embodiment, detecting an initial intra-prediction mode comprises detecting the intra-prediction mode used for a preceding block.

In a second step 504, a delta value is detected. In some embodiments, this comprises detecting a section within a received bitstream that comprises a delta value. In some embodiments, this comprises detecting a final intra-prediction mode, e.g. through a section of the received bitstream. The delta value specifies a change in the intra-prediction mode to be used between samples, e.g. the delta value may specify a change in the weightings applied to reference samples and/or prediction direction.

In a third step 506, the sample values for the current block are predicted using the initial intra-prediction mode and the detected delta value.

Figure 6:
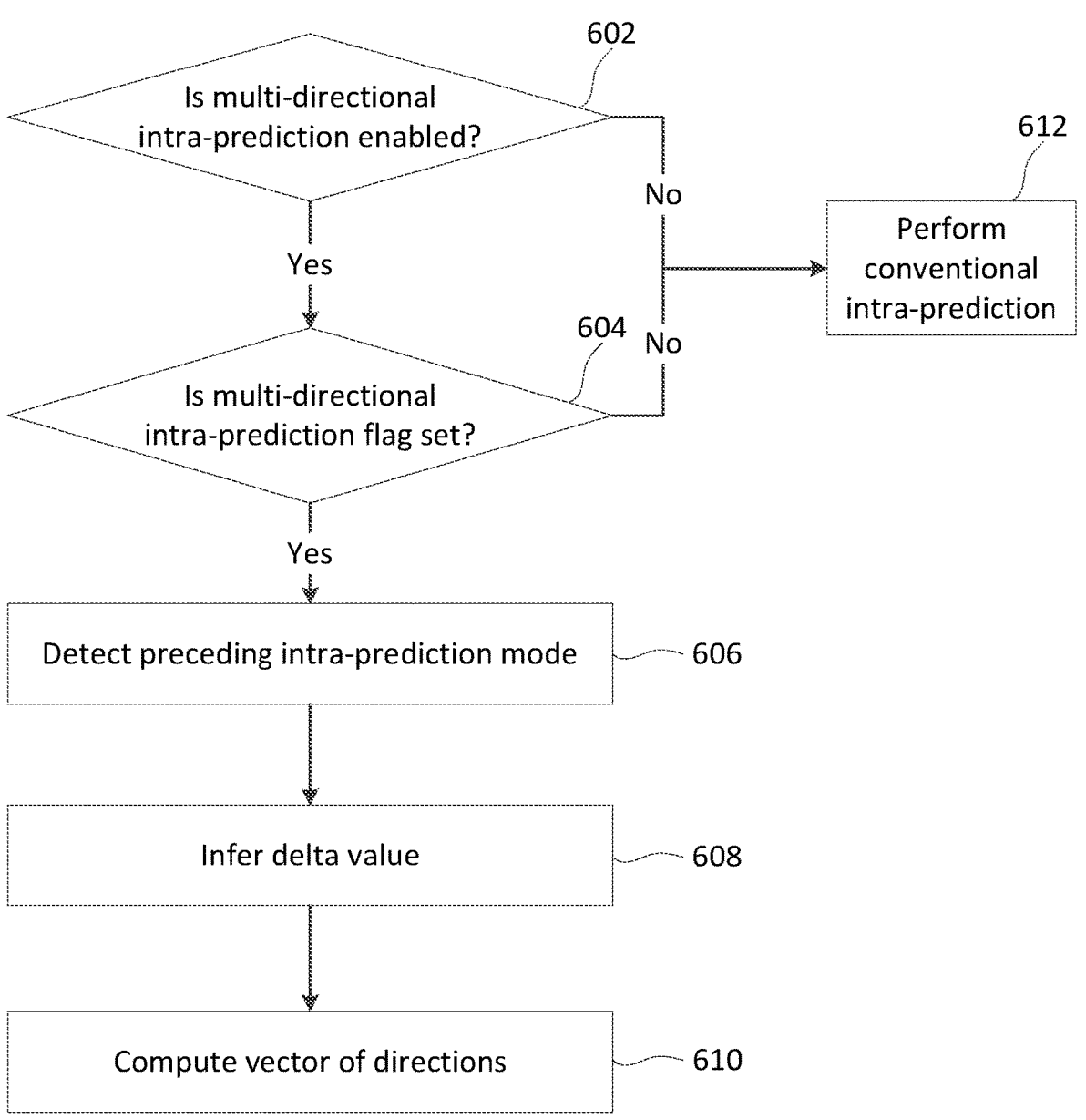
FIG. 6 is a flowchart for a detailed exemplary method of inferring directions of intra-prediction.

FIG. 6 presents an exemplary flowchart for parsing, at the decoder 1, the information needed to perform the multi-directional intra-prediction.

In a first step 602, the decoder 1 parses the current intra-prediction mode for the current block $D_{curr}$. If the detected mode corresponds to one of the modes in which multi-directional intra-prediction is disabled, then the decoder does not parse any additional bits, and performs conventional intra-prediction 612.

If the current intra-prediction mode corresponds to one of the modes in which multi-directional intra-prediction is enabled, in a second step 604, the decoder 1 parses a flag $b_{MIP}$ to select whether to perform multi-directional intra-prediction or not. If $b_{MIP}$==false, the decoder performs conventional intra-prediction 612.

If the multi-directional intra-prediction flag is set, in a third step 606, the "final intra-prediction mode" $D_{final}$ to use in the multi-directional intra-prediction is set equal to the intra-prediction mode parsed for the current block: $D_{final}=D_{curr}$.

If $D_{curr}$ is classified as a "vertical intra-prediction mode", then the decoder accesses information on the intra-prediction mode that is used in the neighbouring block on top of the current block. If this information is available as $D_{top}$ and if $D_{top}$ is classified as a "vertical intra-prediction mode", then the decoder 1 sets the "start intra-prediction mode" to this mode, or $D_{start}=D_{top}$.

If $D_{curr}$ is classified as a "horizontal intra-prediction mode", then the decoder 1 accesses information on the intra-prediction mode that is used in the neighbouring block on the left of the current block. If this information is available as $D_{left}$ and if $D_{left}$ is classified as a "horizontal intra-prediction mode", then the decoder 1 sets the "start intra-prediction mode" to this mode, or $D_{start}=D_{left}$.

In a fourth step 608, the decoder 1 infers a value delta ($\Delta$) which depends on the current block size and $D_{final}$.

In some embodiments, the decoder 1 considers two possible "start intra-prediction mode" candidates $D_{start,1}=(D_{final}+\Delta)$ and $D_{start,2}=(D_{final}-\Delta)$. If $D_{start,1}$ is not a valid directional intra-prediction mode, the decoder 1 sets the "start intra-prediction mode" to $D_{start}=D_{start,2}$. If $D_{start,2}$ is not a valid directional intra-prediction mode, the decoder 1 sets the "start intra-prediction mode" to $D_{start}=D_{start,1}$. In some embodiments, the decoder 1 parses an additional flag $b_{MIP\_DIR}$. If $b_{MIP\_DIR}$==0, then $D_{start}=D_{start,1}$ else $D_{start}=D_{start,2}$.

In some embodiments, the value $\Delta$ is inferred as the difference between the start and final intra-prediction modes, or a factor thereof, that is $\Delta=D_{final}-D_{start}$.

In a fifth step 610, the decoder 1 makes use of $D_{final}$, $D_{start}$ and a width and height of the block to compute a vector of directions D that specifies the intra-prediction direction for each sample. The decoder 1 performs multi-directional intra-prediction using D and exits this loop.

In some embodiments, inferring a delta value 608 may comprise inferring the intra-prediction mode, a method of which is described with reference to FIG. 7. More generally, inferring an intra-prediction mode may comprise interpolation between an initial intra-prediction mode and a final intra-prediction mode.

Figure 7:
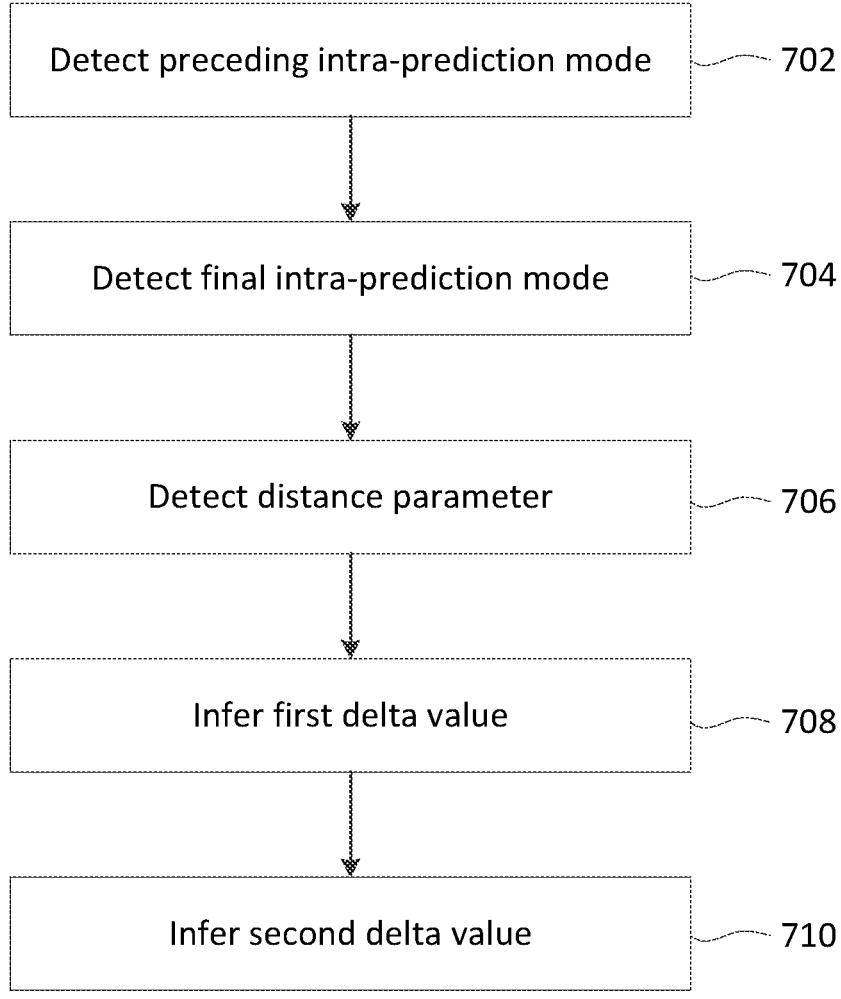
FIG. 7 is an exemplary flowchart for a method of further inferring a prediction mode to be used for intra-prediction.

FIG. 7 shows an exemplary flowchart for a method of inferring an intra-prediction mode.

In a first step 702, the decoder 1 detects a preceding intra-prediction mode. This may, for example, be a mode that has been applied to the block to the left of the current block or the block on top of the current block.

In a second step 704, a final intra-prediction mode is detected. In this embodiment, the final intra-prediction mode is signalled in the bitstream received by the decoder 1.

In a third step 706, a distance parameter is detected. In this embodiment, this distance parameter is encoded in the bitstream. In some embodiments, the distance parameter is inferred from the initial and final intra-prediction modes.

The distance parameter indicates the K-th sample, the K-th sample being that at which the prediction mode changes from the initial prediction mode to the final prediction mode. Typically, this distance parameter is a proportion of the block, or a number of samples (e.g. rows or columns).

In a fourth step 708, a first delta value is inferred for a first portion of the block, the first portion comprising the samples before the K-th sample. This inferring proceeds as has been described with reference to the fourth step 608 of FIG. 6. Inferring a delta value typically comprises interpolating between the initial intra-prediction mode and the final intra-prediction mode.

In a fifth step 710, the decoder infers a second delta value. This inferring proceeds as has been described with reference to the fourth step 608 of FIG. 6.

In general, the inferring of a first delta value and a second delta value depends upon the intra-prediction modes specified. As an example, where the initial intra-predication mode is the DC mode and the final intra-prediction mode is a directional mode, the first delta value is equal to zero, that is each sample before the K-th sample is an average of the reference samples. The second delta value is inferred by interpolating between the DC mode and the final direction mode.

Similarly, where the final intra-prediction mode is the DC mode and the initial intra-prediction mode is a directional mode, the second delta value is equal to zero and the first delta value is inferred by interpolating between the initial directional mode and the DC mode.

In some embodiments, there is defined a K-th sample at which the method of inferring is altered. There may be detected an initial directional intra-prediction mode and a final directional intra-prediction mode and a distance parameter that indicates a K-th sample at which the delta inference method changes, for example from a linear to an exponential interpolation.

In some embodiments, each delta value is specified within the bitstream received by the decoder 1.

Figure 8:
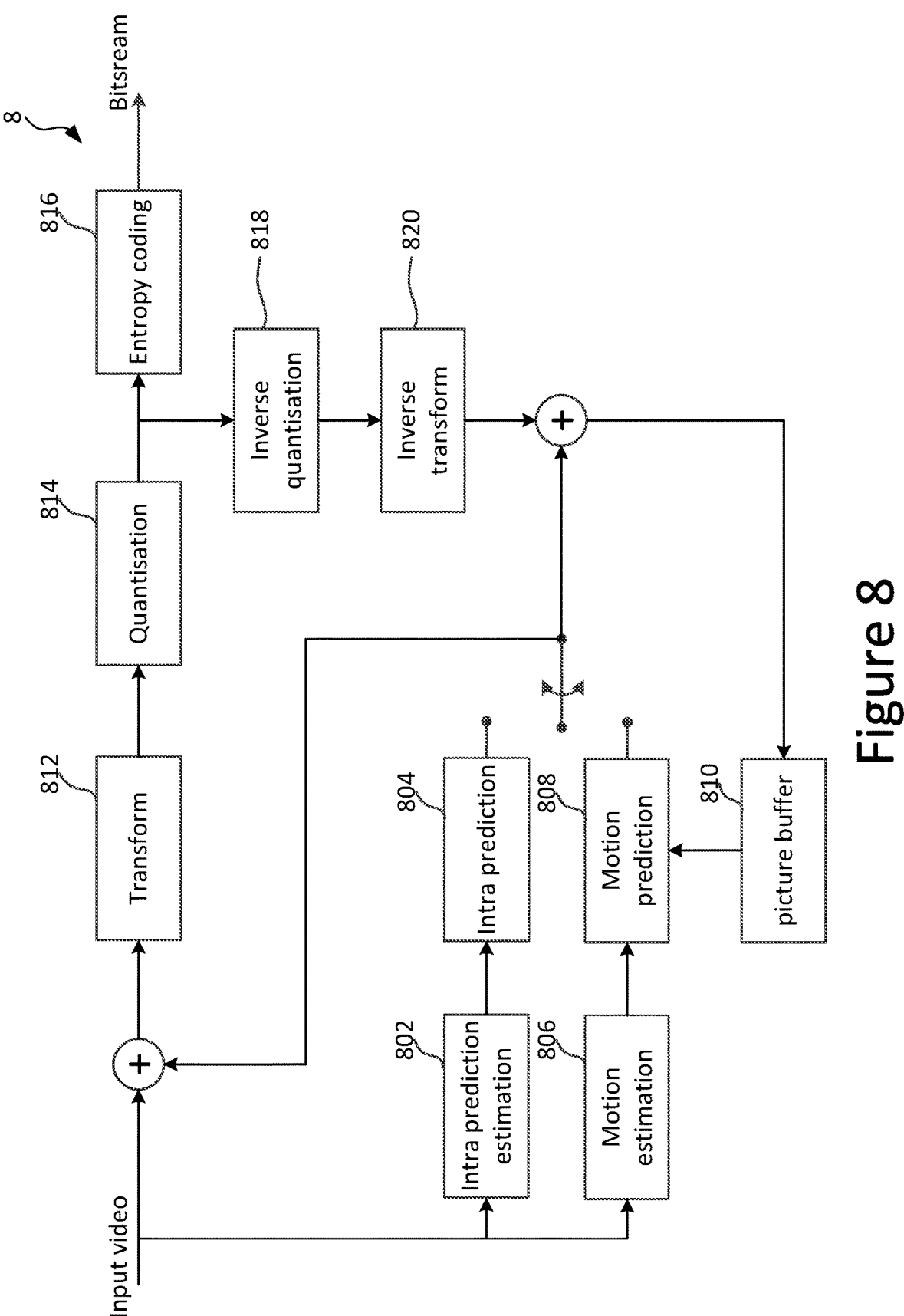
FIG. 8 shows a video encoder.

FIG. 8 shows an encoder 8, as may be used to obtain a bitstream that is readable by the decoder 1 described with reference to FIG. 1.

An input video stream has an intra prediction estimate 802 and/or a motion estimation 806 performed which identify spatial and/or temporal redundancies. These lead to an intra prediction 804 and a motion prediction 808, the motion prediction being dependent upon a picture from a picture buffer 810, which holds a picture equivalent to a previous frame encoded by the encoder 8.

The intra prediction 804 and/or the motion prediction 808 are combined with the input video and then transformed 812, quantised 814, and entropy coded 816 to obtain a bitstream. The transformed 812 and quantised 814 data stream undergoes inverse quantisation 818 and inverse transformation 820 to obtain a reference frame that is used by the picture buffer 810 for subsequent frames.

In various embodiments, the intra prediction stage comprises one or more of: a bit that specifies whether multi-directional intra-prediction is being used; a section that specifies at least one of the initial and final prediction modes to use; a section that defines the inference/interpolation methods to be used; a section that indicates a K-th sample at which the intra-prediction mode changes.

ALTERNATIVES AND MODIFICATIONS

In various embodiments, a block as used herein refers to a prediction unit (PU), a coding unit (CU) and/or a transform unit (TU), e.g. as defined within the HEVC/H.265 version 5 standard of 13 Feb. 2018. More generally, a block may refer to any group of pixels. Preferably, a block refers to a group of connected pixels where these may be spatially connected.

In some embodiments, a block relates to a group of pixels that share common reference samples for the purposes of intra-prediction. This does not require each pixel value within the block to be predicted directly from the reference samples; in some embodiments, pixel values within a block may be predicted using other pixel values within the same block, those other pixel values being predicted using the common reference samples. In these embodiments, the predicted pixel values can each be considered to be derived from the reference samples.

The detailed description has primarily considered the methods described herein being used to determine a change in the direction of intra-prediction performed for a block and the method has been described herein as multi-directional intra-prediction. More generally, the methods are useable to specify a change within the intra-prediction mode. As an example, the initial samples in a block may be predicted using a "vertical-left" prediction mode and the final samples may be predicted using a DC intra-prediction mode. Within the block, there may be a smooth transition between these modes, or a transition between the modes may be defined using a look-up table. As such, with multi-directional intra-prediction there may not be a change in direction, for example there may instead be a change in mode.

In embodiments where a look-up table is used, the table may be addressed in various ways, for example, a first string of bits within the received bitstream may refer to a final intra-prediction mode and a second string of bits may refer to a transition method (e.g. linear, exponential). An initial intra-prediction mode may be included within this bitstream or inferred, e.g. from adjacent blocks.

While the method has been described with reference to use for frames within a videostream, it could similarly be used for still images, such as those conforming to the standards of the Joint Photographic Experts Group (JPEGs).

Where the method has been described with reference to the direction of a prediction mode, it will be appreciated that this may be any direction and is not limited to the directions of conventional directional prediction modes. For example, while the HEVC/H.265 version 5 standard of 13 Feb. 2018 considers 33 angular modes, and these may be the modes specified by a conventional encoder/decoder it will be appreciated that the methods used herein may be used with a prediction definition not within this or other standards. Where the initial and/or final directions of intra prediction are determined to correspond to one of these standard modes, the intermediate directions of intra prediction need not be limited to the standard modes (these intermediate non-standard directions may, in some embodiments, also be considered as directions of intra-prediction modes).

The invention claimed is:

1. A method of decoding in a decoder a bitstream representing an image, where the bitstream comprises a plurality of blocks of residual samples, where a block of reconstructed image samples is obtained by adding a block of residual samples to a block of predictions, the predictions being formed by applying a selected prediction process to reference samples in the reconstructed image, the method comprising the steps of:

receiving the bitstream;

for each block, forming predictions and adding a respective prediction to each residual sample to form a reconstructed image sample;

providing a reconstructed image from the reconstructed image samples; and outputting the reconstructed image;

wherein the step of forming predictions for a block comprises:

determining reference samples for said block;

applying a first directional or non-directional prediction mode to the reference samples to form at least a first set of one or more predictions for said block; and applying one or more subsequent, different, directional or non-directional prediction modes to the reference samples to form at least one subsequent set of one or more predictions for said block, where any subsequent directional prediction mode differs from any first directional prediction mode in the spatial direction of prediction;

wherein the predictions formed for said block include the first set of one or more predictions and the one or more subsequent sets of one or more predictions;

wherein the bitstream defines a process to derive one or more subsequent directional or non-directional prediction modes given a different initial directional or non-directional prediction mode;

wherein one or more of the subsequent prediction modes are derived at the decoder based on the process defined in the bitstream and the first prediction mode; and wherein at least one of the prediction parameters is determined by interpolating between the first direction and/or prediction mode and a final direction and/or prediction mode and/or wherein at least one of the prediction parameters is determined by interpolating linearly between the first direction and/or prediction mode and a final direction and/or prediction mode.

2. The method of claim 1, wherein the bitstream comprises data relating to the prediction.

3. The method of claim 1, wherein the bitstream comprises an indication of a final intra-prediction mode and/or the direction of a final directional prediction mode.

4. The method of claim 1, wherein the subsequent non-directional prediction mode is a final non-directional prediction mode and/or wherein the direction of a subsequent directional prediction mode is the direction of a final directional prediction mode.

5. The method of claim 1, wherein at least one of the prediction parameters is determined based upon a corresponding parameter within an adjacent block, preferably a final corresponding parameter used in the adjacent block.

6. The method of claim 1, wherein at least one of the prediction parameters is determined by obtaining a value from a look-up table.

7. The method of claim 6, wherein the look-up table comprises an indication of a function used for interpolating between at least one of: any first non-directional prediction mode and any subsequent non-directional prediction mode; and/or the direction of any first directional prediction mode and the direction of any subsequent directional prediction mode.

8. The method of claim 1, wherein the bitstream defines a process to derive one or more subsequent directional or non-directional prediction modes given a different directional or non-directional prediction mode.

9. The method of claim 1, wherein the bitstream comprises a delta related to the difference between the direction of any first directional prediction mode and the direction of any subsequent directional prediction mode.

10. The method of claim 1, wherein the bitstream comprises a delta related to the difference between at least one of: the direction of any first non-directional prediction mode and the direction of any subsequent non-directional prediction mode; the direction of any first non-directional prediction mode and the direction of any subsequent directional prediction mode; and/or the direction of any first directional mode and the direction of any subsequent non-directional prediction mode.

11. The method of claim 1, wherein the bitstream comprises an indication of a change between any non-directional prediction mode and any directional prediction mode, preferably wherein the indication identifies a location at which the change occurs.

12. The method of claim 1, wherein the first prediction mode is used to predict at least one row in the block and any subsequent prediction mode is used to predict at least one or more other rows in the block.

13. The method of claim 1, wherein the first prediction mode is used to predict at least one column in the block and any subsequent prediction modes are used to predict at least one or more other columns in the block.

14. A method of decoding images within a video stream using the method of claim 1.

15. A computer program product adapted to cause a programmable apparatus to implement a method according to claim 1.

16. A method of decoding in a decoder a bitstream representing an image, where the bitstream comprises a plurality of blocks of residual samples, where a block of reconstructed image samples is obtained by adding a block of residual samples to a block of predictions, the predictions being formed by applying a selected prediction process to reference samples in the reconstructed image, the method comprising the steps of:

receiving the bitstream;

for each block, forming predictions and adding a respective prediction to each residual sample to form a reconstructed image sample;

providing a reconstructed image from the reconstructed image samples; and outputting the reconstructed image;

wherein the step of forming predictions for a block comprises:

determining reference samples for said block;

applying a first directional or non-directional prediction mode to the reference samples to form at least a first set of one or more predictions for said block; and applying one or more subsequent, different, directional or non-directional prediction modes to the reference samples to form at least one subsequent set of one or more predictions for said block, where any subsequent directional prediction mode differs from any first directional prediction mode in the spatial direction of prediction;

wherein the predictions formed for said block include the first set of one or more predictions and the one or more subsequent sets of one or more predictions; and wherein at least one of the following prediction parameters is derived at the decoder for said block:

a first non-directional prediction mode:

a direction of a first directional prediction mode:

a subsequent non-directional prediction mode:

a direction of a subsequent directional prediction mode:

the location in the block of the first set of predictions; and the location in the block of a subsequent set of predictions:

wherein at least one of the prediction parameters is determined by interpolating between the first direction and/or prediction mode and a final direction and/or prediction mode and/or wherein at least one of the prediction parameters is determined by interpolating linearly between the first direction and/or prediction mode and a final direction and/or prediction mode.

17. A method of decoding in a decoder a bitstream representing an image, where the bitstream comprises a plurality of blocks of residual samples, where a block of reconstructed image samples is obtained by adding a block of residual samples to a block of predictions, the predictions being formed by applying a selected prediction process to reference samples in the reconstructed image, the method comprising the steps of:

receiving the bitstream;

for each block, forming predictions and adding a respective prediction to each residual sample to form a reconstructed image sample;

providing a reconstructed image from the reconstructed image samples; and outputting the reconstructed image;

wherein the step of forming predictions for a block comprises:

determining reference samples for said block;

applying a first directional or non-directional prediction mode to the reference samples to form at least a first set of one or more predictions for said block; and applying one or more subsequent, different, directional or non-directional prediction modes to the reference samples to form at least one subsequent set of one or more predictions for said block, where any subsequent directional prediction mode differs from any first directional prediction mode in the spatial direction of prediction;

wherein the predictions formed for said block include the first set of one or more predictions and the one or more subsequent sets of one or more predictions; and wherein the bitstream defines a process to derive one or more subsequent directional or non-directional prediction modes given a different initial directional or non-directional prediction mode;

wherein one or more of the subsequent prediction modes are derived at the decoder based on the process defined in the bitstream and the first prediction mode;

wherein at least one of the prediction parameters is determined by obtaining a value from a look-up table; and wherein the look-up table comprises an indication of a function used for interpolating between at least one of: any first non-directional prediction mode and any subsequent non-directional prediction mode; and/or the direction of any first directional prediction mode and the direction of any subsequent directional prediction mode.

* * * * *